3,135,750
NOVEL BISACETAMIDES

William F. Bruce, Havertown, and Joseph Tokolics, King of Prussia, Pa., assignors to American Home Products Corporation, New York, N.Y., a corporation of Delaware
No Drawing. Filed Feb. 26, 1962, Ser. No. 175,836
4 Claims. (Cl. 260—247.2)

The invention relates generally to amides, and more particularly to novel bisacetamides and salts thereof.

In U.S.P. 2,780,646 there are disclosed novel alkanol amino-bisacetamides, their salts, and methods for producing them. As noted in the patent, the compounds disclosed and claimed therein show surprisingly good local anesthetic action. However, it is stated in the patent that the replacement in the class of compounds disclosed therein, of the hydroxy group with an amino radical, for example, was found to destroy the local anesthetic action and that other than in the cases of aliphatic, aromatic or heterocyclic or inorganic acid esters of said compounds, no prediction with regard to local anesthetic action is possible when other radicals replace the alkanol residue attached to the amino nitrogen atom.

It has now been discovered that certain other bisacetamides as defined hereinafter which include compounds that do not contain an alkanol residue also show good local anesthetic action and, in addition, broad spectrum antibiotic action. The new compounds, in the form of the free bases, may be represented by the formula:

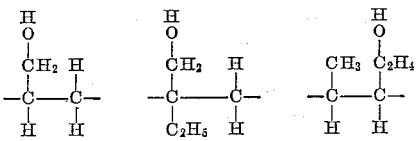

wherein $R_1$ and $R_3$ represent lower alkyl radicals, $R_2$ and $R_4$ represent aralkyl radicals, X and Y represent divalent lower alkylene radicals and Z is an amino radical of the group consisting of:

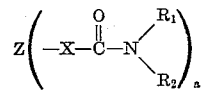

and

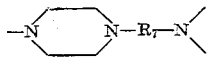

wherein $R_5$ and $R_6$ represent lower alkyl radicals, $R_7$ represents a divalent radical of the group consisting of ethylene, lower-alkyl substituted ethylenes, and the hydroxy-lower-alkyl substituted ethylenes; $a$ and $b$ both being 1 when Z is divalent, and $a$ being 1 and $b$ being 2 when Z is trivalent. The aralkyl radicals $R_2$ and $R_4$ may represent phenyl- or substituted phenyl-lower alkyl radicals wherein such substituents as lower alkyl-, lower alkoxy-, hydroxy-, halogen-, nitro-, amino-, mono- or di-lower alkyl-amino radicals may be on the ring. In the case of aralkyls of the beta-phenylethyl type, hydroxy substituents on the beta-carbon of the alkyl are also contemplated. In the case of the lower-alkyl substituted ethylenes, the groups contemplated by the invention include, for example,

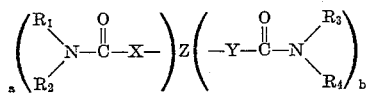

and the like. The hydroxy-lower-alkyl substituted ethylenes referred to are intended to include similar groups wherein the alkyl substituent or substituents may be replaced by hydroxy-alkyl radicals such as in

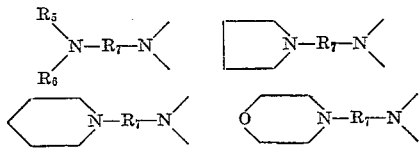

and the like.

When the acetamide groups are similar, the new compounds, in the form of the free bases, may be represented by the formula:

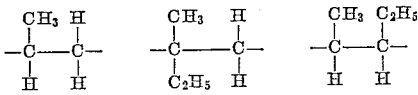

wherein $R_1$, $R_2$ X and Z may have the same meaning as set forth above; in this case, however, $a$ is 2 when Z is divalent, and 3 when Z is trivalent.

It has been discovered that when more than 2 carbon atoms separate the nitrogens of the amino groups in Z, the desired activity of the resulting compounds is affected adversely. However, increase of the total number of carbon atoms of the alkylene chain by the presence of branch chains, as exemplified above, does not have such effect, nor when hydroxy-alkyl groups supply the additional carbon atoms.

The dual nature of these new compounds falling within the definition above, whereby they unexpectedly show both local anesthetic action and antibiotic action, was a totally unpredictable characteristic. Similarly, no prediction with regard to combined anesthetic and antibiotic action is possible where Z represents radicals other than those of the classes specified above. For example, the compounds (I) $NH_2.CH_2.CH_2N.[CH_2CON(CH_3)C(CH_3)_2.CH_2.C_6H_5]_2$ (II) $HO.(CH_2)_6.N.[CH_2CON(CH_3)C(CH_3)_2.CH_2.C_6H_5]_2$ were found to have neither anesthetic nor substantial antibiotic action.

Compounds falling within the scope of the formula as given above may be used in the form of acid-addition salts while still retaining their effectiveness for local anesthetic use or antibiotic action as the case may be. The salts provide great flexibility in therapeutic use since they may impart various degrees of water-solubility to an otherwise substantially insoluble base. With reference to the acid-addition salts, either organic or inorganic acids may be used as long as they do not substantially increase toxicity of the compound, particularly when the compound is to be used for its local anesthetic or in vivo antibiotic function. Thus, the hydrochloride, sulfate, phosphate, hydrobromide, acetate, tartrate, propionate or succinate are among the salts considered useful for the purposes indicated.

In preparing the novel bisacetamides of the invention, the free bases are prepared by reacting an appropriate amine which will furnish the desired amino residue Z (as defined above) in the final compound, with an alpha-halo-fatty acid amide containing the required lower alkyl and aralkyl substituents on the nitrogen atom as specified hereinbefore, in a molar ratio of 1:2 when the amine compound is difunctional, and a molar ratio of 1:3 when the amine compound is trifunctional. Preferably, the amide is present in slight excess of the ratios stated.

On the other hand, where the fatty acid amide residues in the final compounds are desired to be dissimilar, as, for example, where X and Y are to be different alkylene radicals or where $R_1$ is to differ from $R_3$, the bases may be prepared by initially reacting in a molar ratio of say about 1:1, the chosen amine that will supply the radical Z, as defined herein, with a halo-fatty acid amide that will supply the X and $R_1$ radicals desired. The resulting amino-fatty acid amide may then be reacted with another halo-fatty acid amide in say about 1:1 molar ratio, the latter amide being chosen so that it will supply the differing Y and $R_3$ radicals desired in the final bisacetamide. As will readily appear to those skilled in the art, the halo-fatty acid amide to amine (or amide) ratios may be varied (up to 1:3) and the number of step-wise reactions varied, depending upon the functionality of the original amino compound employed (or the valency of Z) and the degree of variation desired in substituents X, Y, $R_1$, $R_2$, $R_3$ and $R_4$. Alternately, appropriate mixtures of differing halo-fatty acid amides may be reacted simultaneously with the amine compound. The halogen atom in the halo-fatty acid amides used may be either chlorine or bromine. Generally, the bisacetamides of the invention are prepared as taught by the general procedure outlined in the patents to Bruce et al., 2,568,142, dated September 18, 1951, or 2,654,754, dated October 6, 1953, suitably modified, of course, to provide the proper amine and halogenated reactants.

The reaction of the amide and amine is carried out substantially under conditions as described in the above-mentioned U.S. Patent No. 2,780,646. Thus, the reaction temperature is in the range of about 80° to about 180° C. Alcohols of 3 to 7 carbon atoms, anisole, dioxane, hydrocarbon solvents, such as xylene, or in fact, any inert solvent boiling within the ranges indicated are suitable, reaction taking place at the refluxing temperature of the solvent. Acid acceptors or mildly basic material are also provided for the reaction. These acceptors may be an alkali or alkaline earth metal oxide, carbonate or bicarbonate, pyridine, or like substances.

To prepare the acid-addition salts of the compounds discussed herein, the free base is generally dissolved in a suitable solvent and the selected acid is added thereto. Such preparation of acid-addition salts is well known and hence need not be described herein.

The following examples illustrate the preparation of typical compounds falling within the scope of the invention.

EXAMPLE 1

*Preparation of 2,2'-(2-Diethylaminoethylimino)Bis[N-(a,a - Dimethylphenethyl)-N-Methylacetamide]Di-Hydrochloride*

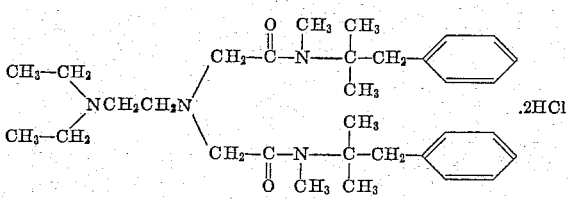

A mixture of 50 g. of 2-chloro-N-(a,a-dimethylphenethyl-(N-methylacetamide, 11.6 g. of N,N-diethylethylene diamine, 40 g. of powdered anhydrous potassium carbonate and 250 ml. of n-butanol was refluxed for 20 hours. The reaction mixture was then cooled and filtered. The filtrate was washed with aqueous 5% sodium carbonate then with water, and dried over anhydrous magnesium sulfate. The solvent was completely removed under reduced pressure.

The free base was converted to the hydrochloride by dissolving the residue in ether and adding dry hydrogen chloride. Recrystallized from acetone-chloroform, it melted at 124–126° C.

*Analysis.*—Calcd. $C_{32}H_{52}Cl_2N_4O_3$: Cl, 11.90; N, 9.40. Found: Cl, 11.60; N, 9.24.

EXAMPLE 2

*Preparation of 2,2'-(2-Morpholinoethylimino)Bis[N-(a,a-Dimethylphenethyl) - N - Methylacetamide]Di-Hydrochloride*

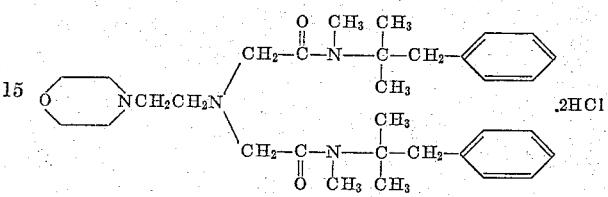

A mixture of 58 g. of 2-chloro-N-(a,a-dimethylphenethyl-(N-methylacetamide, 13 g. of N-(beta-aminoethyl) morpholine, 40 g. of powdered potassium carbonate, and 300 ml. of n-butanol was refluxed for 24 hours. The reaction mixture was then cooled and filtered. The filtrate was washed with aqueous 5% sodium carbonate then with water, and dried over anhydrous magnesium sulfate. The solvent was completely removed under reduced pressure.

The free base was converted to the hydrochloride by dissolving the residue in ether and adding dry hydrogen chloride. Recrystallized from acetone-chloroform, it melted at 173–176° C. with decomposition.

*Analysis.*—Calcd. for $C_{35}H_{50}Cl_2N_4O_3$: Cl, 11.63; N, 9.19. Found: Cl, 11.56; N, 8.93.

EXAMPLE 3

*Preparation of 2,2'-(2 - [4 - ([(a,a-Dimethylphenethyl) Methylcarbamoyl]Methyl) - 1-Piperazinyl]Ethylimino) Bis[N - (a,a-Dimethylphenethyl)-N-Methylacetamide] Tri-Hydrochloride*

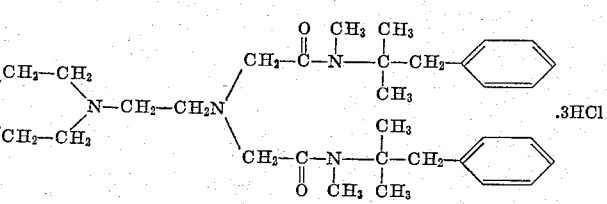

A mixture of 97 g. of 2-chloro-N-(a,a-dimethylphenethyl)-N-methylacetamide, 13 g. of N-aminoethyl piperazine, 58 g. of powdered anhydrous potassium carbonate and 200 ml. of n-butanol was refluxed for 24 hours. The reaction mixture was then cooled and filtered. The filtrate was washed with aqueous 5% sodium carbonate, then with water and dried over anhydrous magnesium sulfate. The solvent was completely removed under reduced pressure.

The free base was converted to the hydrochloride by dissolving the residue in ether and adding dry hydrogen chloride. Recrystallized three times from hot acetone with just enough methanol for solution, the salt melted at 243–245° C. with decomposition.

*Analysis.*—Calcd. for $C_{45}H_{69}Cl_3N_6O_3$: C, 63.70; H, 8.20; Cl, 12.54; N, 9.90. Found: C, 63.84; H, 8.20; Cl, 12.20; N, 10.00.

Each of the products of Examples 1–3 in the form of the designated acid-addition salt was tested to determine its respective local anesthetic and bacteriostatic action. The method of testing for local anesthetic action comprised the simple procedure of placing .1 mg. of the compound on the tongue of a human and then noting subjectively the time it took for numbness to subside. To designate the degree of local anesthetic action of the compounds tested, an arbitrary scale was employed wherein + was used to designate anesthetizing characteristics which persisted for from 2–5 minutes. On this same scale ++ would indicate anesthetic action for from 15–20 minutes, and +++ for such action enduring from 1–2 hours. The ++++ designation was used to indicate extraordinary action wherein numbness persisted for 3–4 hours; the +++++ rating would be applied to compounds causing numbness for from 8–10 hours; and the ++++++ rating was used to designate local anesthetic action persisting from 15–20 hours. This scale is employed in the table below.

In testing for bacteriostatic action, the method generally comprised preparation of a plurality of Petri dishes each containing a predetermined amount of agar media into which solutions of decreasingly varying concentrations of each of the compounds under consideration were incorporated starting with a maximum concentration thereof per volume of solution, to which a standard volume of a given bacterial strain was later introduced. If bacterial growth was observed to be halted, the same standard volumes of the given bacterial strain were separately added to each of other agar specimens containing lesser amounts of the compound being tested. In said agar specimens, decreasing concentrations of a specified compound of 1000, 500, 250, 100, 25, 10 and 1 $\mu$g. were utilized.

In the specific application utilized, a series of stock solutions were prepared, each at a level of 10,000 $\mu$g./ml., by dissolving the compound being tested in water. As known in the art, other suitable solvents such as ethanol, methylcellosolve, propylene glycol, etc. may be employed. Thereafter, working dilutions of the decreasing concentrations referred to above were made from each stock solution with inclusion of phosphate buffer to achieve pH 6–7. One ml. volumes of the varying working dilutions were then transferred to sterile Petri dishes. To each dish containing the one ml. volume of a specific working dilution of a given compound were then added 9 ml. of sterile penicillin seed agar and the test compound was thoroughly mixed in to the agar. Solvent and buffer controls were included. The test organisms were grown in brain heart infusion broth for 18 hours at 35° C. and diluted to $\frac{1}{10}$ concentration prior to use. The test organisms, in volumes of approximately 0.8 $\mu$l. were then mechanically deposited on the cooled and hardened surface of the agar of each dish by means of an inocula replicator device. The dishes were then incubated for 18 hours at 35° C. before being read. The minimal inhibitory concentration (MIC) value recorded for comparison was the least amount of the compound under test that completely inhibited the specific test organism employed.

The results of the foregoing tests on the 3 compounds of the examples and on several other compounds included for comparison are given in the table below:

of such characteristics will be more readily recognized when it is noted that compounds 1 and 2, which under the test conditions warranted the minimum rating of ++++ of the compounds tested coming within the scope of the invention, yet were found to be about $4 \times 10^3$ times as effective as novocaine or cocaine. In addition, each of the compounds 1–3 showed significant bacteriostatic action. On the other hand, the results with respect to compound 5 demonstrated the unpredictability of combined local anesthetic and bacteriostatic action upon variation of amine residue Z from the definition thereof in accordance with the present invention. It is of further significance in connection with the unpredictability of finding combined anesthetic and bacteriostatic action in a given compound that, with respect to the local anesthetic novocaine, Moeller and Schwarz Ber., 74B, 1612 (1941), state that contrariwise the compound is a weak growth promoter for bacteria.

EXAMPLE 4

Preparation of 2,2'-(2-Dimethylaminoethylimino)bis[N-(a,a, - Dimethylphenethyl) - N - Methylacetamide]Di-Hydrochloride By a procedure following that given in Example 1, a mixture of 2-chloro-N-(a,a,-dimethylphenethyl)-N-methylacetamide, N,N-dimethylethylene diamine, powdered anhydrous potassium carbonate and n-butanol gives 2,2'-(2 - dimethylaminoethylimino)bis[N - (a,a-dimethylphenethyl)-N-methylacetamide]di-hydrochloride.

EXAMPLE 5

Preparation of 2,2'-(2-Di-n-Propylaminoethylimino)Bis-[N - (a,a - Dimethylphenethyl - N - Methylacetamide]-Di-Hydrochloride In a procedure similar to that in Example 1, 2-chloro-N - a,a - di - methylphenethyl) - N - methylacetamide, N,N-di-n-propylethylene diamine, powdered anhydrous potassium carbonate, and n-butanol gives 2,2'-(2-di-n-propylaminoethylimino)bis[N - (a,a - dimethylphenethyl)-N-methylacetamide]di-hydrochloride.

EXAMPLE 6

Preparation of 2,2'-(2-Piperidinoethylimino)Bis[N-(a,a-Dimethylphenethyl) - N - Methylacetamide]Di - Hydrochloride Following a procedure like that of Example 1, a mixture of 2-chloro-N-(a,a-dimethylphenethyl)-N-methylacetamide, N-2-aminoethylpiperidine, anhydrous powdered potassium carbonate, and n-butanol gives 2,2'-(2-piperidinoethylimino)bis[N - (a,a - dimethylphenethyl)-N-methylacetamide]di-hydrochloride.

EXAMPLE 7

Preparation of 2,2'-(2-Pyrrolidinoethylimino)Bis[N-a,a-Dimethylphenethyl) - N - Ethylacetamide]Di - Hydrochloride In a procedure like that of Example 1, a mixture of 2-

TABLE

| Acid-Addition Salt | Anesthetic Action | Bacteriostatic Action | | | | | | | | | |
|---|---|---|---|---|---|---|---|---|---|---|---|
| | | B. subtilis | S. aureus | Mycobact. spp. | Pseudomonas aeruginosa | E. Coli | S. paratyphi | Brucella bronchiseptica | Neisseria Catarrhalis | L. Casei | S. Lactis R |
| 1. Compound of Ex. 1 | ++++ | 25 | 100 | 50 | 500 | 250 | 100 | 250 | 250 | 50 | 250 |
| 2. Compound of Ex. 2 | ++++ | 50 | 100 | 250 | >1,000 | >1,000 | | 1,000 | >1,000 | >1,000 | >1,000 |
| 3. Compound of Ex. 3 | ++++++ | 25 | <1,000 | | >1,000 | >1,000 | 1,000 | 1,000 | >1,000 | >1,000 | >1,000 |
| 4. Cocaine Hydrochloride | + | | | | | | | | | | |
| 5. 2,2'-(2-hydroxypropylimino)bis[N-(2, 6-dimethylphenyl)-N-methylacetamide].hydrochloride | Negative | | | | | | | | | | |

It will be observed that each of the compounds 1–3 coming within the scope of the invention showed local anesthetic action of a marked degree. The importance chloro - N - (a,a - dimethylphenethyl) - N - ethylacetamide, N-2-aminoethylpyrrolidine, anhydrous powdered potassium carbonate, and n-butanol gives 2,2'-(2-pyrrolidinoethylimino)bis[N - (a,a - dimethylphenethyl) - N-ethylacetamide]di-hydrochloride.

We claim:
1. A compound of the group consisting of aralkyl amides and the non-toxic acid-addition salts thereof, said amides having the formula

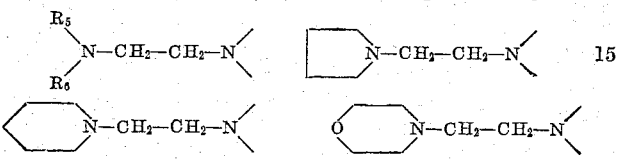

wherein Z is an amino radical of the group consisting of:

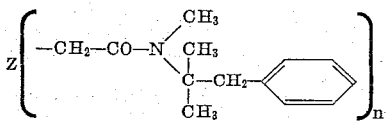

and

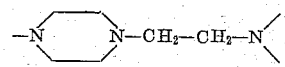

wherein $R_5$ and $R_6$ each represent an alkyl group having from 1 to 2 carbon atoms; $n$ being 2 when Z is divalent, and 3 when Z is trivalent.

2. The compound, 2,2'-(diethylaminoethylimino)bis-[N-(a,a-dimethylphenethyl)-N-methylacetamide].

3. The compound, 2,2'-(N-2-morpholinyl-ethylimino)-bis[N-(a,a-dimethylphenethyl)-N-methylacetamide].

4. The compound, 2,2'-(2-[4-([(a,a-dimethylphenethyl)methylcarbamoyl]methyl) - 1 - piperazinyl]ethylimino)bis[N-(a,a-dimethylphenethyl)-N-methylacetamide].

References Cited in the file of this patent
UNITED STATES PATENTS
2,780,646     Seifter et al. _____ Feb. 5, 1957